US012779375B2

(12) United States Patent
Koch et al.

(10) Patent No.: US 12,779,375 B2
(45) Date of Patent: Nov. 3, 2026

(54) FILTER DEVICE TOGETHER WITH A FILTER ELEMENT WHICH CAN BE ACCOMMODATED THEREIN, AND METHOD FOR OPERATING SUCH A FILTER ELEMENT TOGETHER WITH A DEVICE

(71) Applicant: HYDAC FluidCareCenter GmbH, Sulzbach / Saar (DE)

(72) Inventors: Edwin Koch, Tholey (DE); Timo Lang, Neunkirchen (DE); Christian Adam, Neunkirchen (DE); Daniel Müller, Neunkirchen (DE); Martin Noll, Ingbert (DE); Johannes Staudt, Bexbach (DE)

(73) Assignee: HYDAC FLUIDCARECENTER GMBH, Sulzbach/Saar (DE)

( * ) Notice: Subject to any disclaimer, the term of this patent is extended or adjusted under 35 U.S.C. 154(b) by 385 days.

(21) Appl. No.: 18/562,813

(22) PCT Filed: Apr. 27, 2022

(86) PCT No.: PCT/EP2022/061180

§ 371 (c)(1),
(2) Date: Nov. 20, 2023

(87) PCT Pub. No.: WO2022/242994

PCT Pub. Date: Nov. 24, 2022

(65) Prior Publication Data

US 2024/0216838 A1 Jul. 4, 2024

(30) Foreign Application Priority Data

May 20, 2021 (DE) ..................... 10 2021 002 647.0

(51) Int. Cl.
*B01D 29/41* (2006.01)
*B01D 29/33* (2006.01)
*B01D 39/18* (2006.01)

(52) U.S. Cl.
CPC ............. *B01D 29/41* (2013.01); *B01D 29/33* (2013.01); *B01D 39/18* (2013.01)

(58) Field of Classification Search
CPC ........ B01D 29/41; B01D 29/33; B01D 39/18; B01D 39/04; B01D 39/1623;
(Continued)

(56) References Cited

U.S. PATENT DOCUMENTS 3,231,094 A 1/1966 Wiegand ........................ 210/487
4,629,474 A 12/1986 Thornton ...................... 264/109
(Continued)

FOREIGN PATENT DOCUMENTS

DE 102012211185 A1 1/2014 ............. B01D 27/08
EP 3334512 B1 2/2020 ............. B01D 29/15
(Continued)

OTHER PUBLICATIONS

Search Report for International Application No. PCT/EP2022/061180, 4 pages, Jul. 4, 2022.
(Continued)

*Primary Examiner* — Hayden Brewster
(74) *Attorney, Agent, or Firm* — Slayden Grubert Beard PLLC

(57) ABSTRACT

The invention relates to a filter device, comprising a filter housing (10), which has an inlet (12) for unfiltered medium and an outlet (14) for filtered medium and which accommodates an exchangeable filter element (16). When unfiltered medium flows through said filter element from the outside in, it flows through both a hollow cylindrical element material (18) and an element material (22) which closes the
(Continued)

hollow cylinder (18) at one free end (20) of the hollow cylinder. At the other free end (24) of the hollow cylinder, an element cap (26) having a central opening (28) is used to discharge filtered medium to the outlet (14) in the filter housing (10), the outlet being connected to the central opening (28). Each element material (18, 22) is accommodated seal-free in the filter housing (10) for incident flow on all sides, from the outside in.

19 Claims, 4 Drawing Sheets

(58) Field of Classification Search
CPC .......... B01D 39/2055; B01D 2201/182; B01D 2201/291; B01D 2239/0407; B01D 2239/064; B01D 2239/086; B01D 29/111; B01D 29/114
USPC .......................................................... 210/767
See application file for complete search history.

(56) References Cited

U.S. PATENT DOCUMENTS

| | | | | |
|---|---|---|---|---|
| 4,636,231 | A | 1/1987 | Thornton et al. | 55/318 |
| 4,732,677 | A | 3/1988 | Thornton | 210/347 |
| 11,369,898 | B2 | 6/2022 | Hegmann et al. | |
| 2017/0312663 | A1 * | 11/2017 | Rynbeek | B01D 27/103 |

FOREIGN PATENT DOCUMENTS

| | | | | |
|---|---|---|---|---|
| GB | 1 031 174 | | 5/1966 | |
| WO | 2016 070222 | | 5/2016 | |
| WO | 2018/082799 | A1 | 5/2018 | B01D 29/11 |
| WO | 2022/242994 | A1 | 11/2022 | B01D 29/11 |

OTHER PUBLICATIONS

International Preliminary Report on Patentability, Application No. PCT/EP2022/061180, 10 pages, Nov. 30, 2013.

* cited by examiner

FILTER DEVICE TOGETHER WITH A FILTER ELEMENT WHICH CAN BE ACCOMMODATED THEREIN, AND METHOD FOR OPERATING SUCH A FILTER ELEMENT TOGETHER WITH A DEVICE

CROSS-REFERENCE TO RELATED APPLICATIONS

This application claims priority to German Patent Application No. DE 10 2021 002 647.0, filed on May 20, 2021 with the German Patent and Trademark Office. The contents of the aforesaid Patent Application are incorporated herein for all purposes.

TECHNICAL FIELD

The invention relates to a filter device comprising a filter housing which has an inlet for unfiltered medium and an outlet for filtrate and which accommodates a replaceable, hollow cylindrical filter element for a flow of unfiltered medium from outside to inside.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

A filter element designed as a replaceable element is disclosed in WO 2018/082799 A1, the element material of which, formed as a hollow body and extending between two end caps, is pleated with individual filter pleats, the element material comprising a filter material made of cellulose. When the fluid flows through, the cellulose fibers have a coalescing effect, resulting in the formation of enlarged droplets from the water portion of the emulsion which sink to the bottom due to the difference in density of water and oil, so that separation of the less dense medium takes place. A filter element of this type separates the aforementioned water in a reliable manner and is additionally cost-efficient to produce.

The known filter element can be fixed in a device with a filter housing by means of a mounting rod as part of a fixing device, each end cap of the filter element having a spacer with a sealing function, one on the fixing device and one on an intermediate base of the filter housing. In this manner, there is no need for any additional holding means that protrude beyond the outer circumference of the filter element, which enables a space-saving design.

EP 3 334 512 B1 discloses an oil filtration unit for removing solid contaminants from contaminated oil, comprising:

- a housing comprising a housing inlet, which is suitable for receiving contaminated oil from the environment and discharging the contaminated oil to an inner opening of the housing at a first pressure p1, and a housing outlet which is suitable for discharging filtered oil to the environment, and
- an oil filter for filtering the contaminated oil, the oil filter being arranged in the inner opening of the housing and comprising a filter inlet, which is defined by an external surface of the oil filter, an inner filter volume, which is suitable for receiving filtered oil at a second pressure p2, the second pressure p2 being lower than the first pressure p1, and a filter outlet inside the housing which provides a fluid/liquid connection between the inner filter volume and the housing outlet in order to drain the filtered oil from the inner filter volume,
- an end plate of the oil filter comprising the filter outlet, the entire end plate comprising a porous material through which oil can flow so that at least part of the end plate forms part of the filter outlet,
- and the filter outlet comprising a hydraulic resistor which forms part of the oil filter, said hydraulic resistor providing a fluid/liquid flow restriction between the inner filter volume and the housing outlet in order to increase the second pressure p2 within the inner filter volume and to drain the filtered oil from the inner filter volume into the housing outlet at a third pressure p3, the third pressure p3 being lower than the second pressure p2.

The associated oil filter or filter element is formed as a hollow cylinder and consists in this respect of cellulose material. A disc-shaped end plate of the oil filter comprises the filter outlet of the filter housing, it being possible for the corresponding end plate to comprise a porous material of natural or synthetic polymer and cellulose material. The flow passes through the known filter element, as the oil filter, from the inside out, a hydraulic resistor being formed by the said end plate made of porous material, which resistor in this respect provides a flow restriction between the inner filter volume and the environment in order to achieve the pressure graduation p1>p2>p3 already mentioned. The purpose of this pressure graduation is to prevent a back pressure for the filter element in this way which occurs, for example, if a hydraulic pump device or similar is connected on the output side of the filter.

In addition to the flow from outside to inside, it is necessary for operation that the element material on the base end of the filter element is provided with a sealing device with respect to the accommodating filter housing which, on the one hand, limits the effective filter surface on the filter element and, on the other hand, entails a certain amount of technical equipment effort on the filter housing.

SUMMARY

A need exists to provide a filter element that enables a functionally reliable filtration operation, wherein the efficiency during filtration is improved.

The need is addressed by filter devices and methods for operating a filter element according to the independent claims. Embodiments of the invention are described in the dependent claims, the following description, and the drawings.

DESCRIPTION

Figure 1:
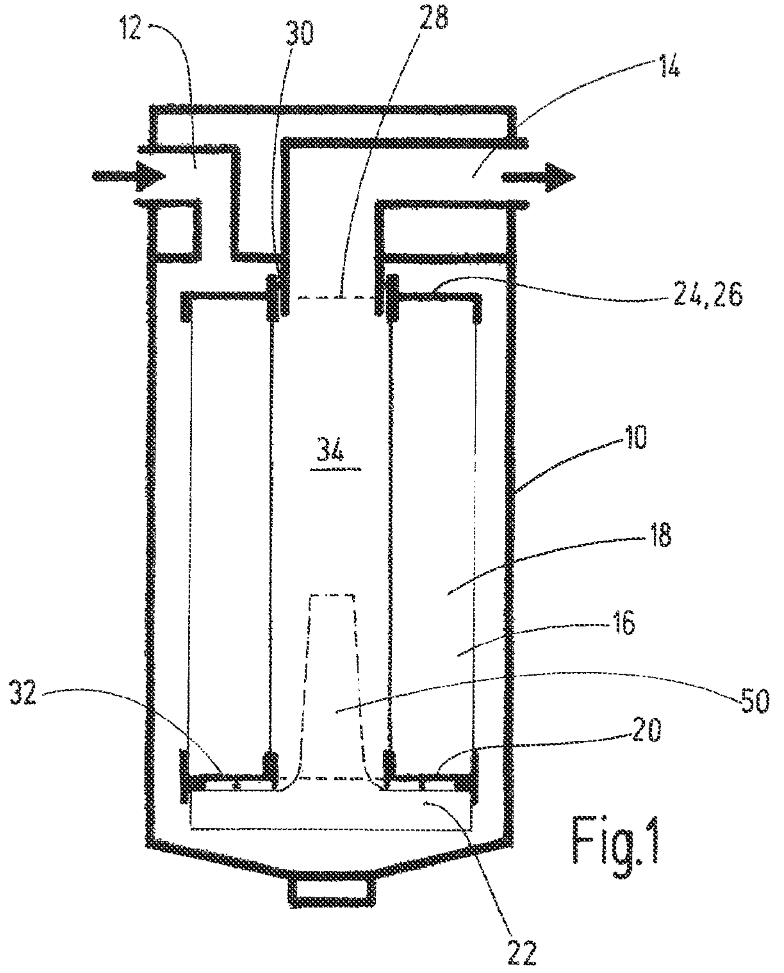
FIG. 1 shows in a longitudinal section, an example filter device as a whole, consisting of a filter housing and an accommodated filter element according to a first embodiment.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a filter device according to some embodiments, it is provided that when unfiltered medium flows through the replaceable filter element from outside to inside, it flows through both a hollow cylindrical element material and an element material which closes off said hollow cylinder at its one free end, at the other free end thereof, an element cap with a central recess is used to discharge filtrate to the outlet in the filter housing which outlet is connected to the central recess, and the respective element material is accommodated seal-free in the filter housing for flow around all sides, from outside to inside, with the result that there is only one single pressure stage, at which the pressure p1 outside the filter element is greater than the discharge pressure p2 on the inside of the hollow cylindrical element material that is closed off towards one side. This results in a substantially improved cleaning balance for the flow of unfiltered medium and proves to be favorable in terms of energy which is also helped by the fact that the hollow cylindrical element material is accommodated on its filtrate discharge side with a continuous discharge opening within the filter housing so that the flow through the filter element takes place to this effect from the base to the head end. The corresponding upward filtration direction for the flow of filtrate to the pressure-reduced discharge side is also favorable from the energy balance point of view.

Since the flow through the element material of the filter element as a whole is from outside to inside and accordingly no additional sealing device of the filter housing engages on the element material on the base end, the full filter surface is available for filtration and the technical equipment effort is reduced due to the omission of such a sealing device.

The filter element for the filter device for example consists entirely of cellulose material on the circumference of the hollow cylindrical element material and also for element material closing off the hollow cylinder which is particularly beneficial, due to the homogeneous formation of the element material, when it is necessary to separate small-particle contaminants from a fluid flow which is the case, for example, when there is a desire to separate oil ageing products (varnish) from the a fluid flow. The method ensures a filtration operation to this effect with the above-mentioned device together with filter element and, due to the only single pressure stage p1 present, fluid resistances in the direction of p2 are reduced and a high filtration performance is achieved during use of the method.

In some embodiments of the filter element, it is provided that the hollow cylinder of the filter element is formed of individual, for example identical, annular filter discs which, arranged one above the other, are firmly connected to one another, for example bonded to one another, on their mutually adjacent end faces and in that the element material which closes off the hollow cylinder at its one free end is formed of a closed filter disc. In this way, the filter element can be constructed in any length, the flow passing through the same annular filter disks which are arranged one above the other, in the sense of a modular system. In addition, the annular filter disks can be produced in large numbers as identical components in the manner of series production which is cost-efficient.

In some embodiments of the filter element, it is provided that all filter discs of cellulose material have the same filter properties, in particular the same filter fineness, and in that the annular filter discs are all constructed identically in terms of their element material. The said filter disks made of cellulose are produced in accordance with DIN EN ISO 5269-2 using the so-called Rapid-Köthen method and, as a standardized method in this respect, a high level of process reliability is achieved during production.

In some embodiments of the filter element, it is provided that the individual annular filter disks have recesses on the outer circumference which are formed by incisions or by adjacent spacers between the filter discs. On the one hand, the recesses obtained increase the stability in the composite sheet with the individual filter discs and permit flow guidance for the flow of unfiltered medium which flows through the filter element with the filter discs from outside to inside. Beneficially, in this case the disc-shaped element material which closes off the hollow cylinder at the end can be provided with an additional geometry, for example in the form of an inlet device which engages in the interior of the hollow cylinder. For targeted flow guidance inside the hollow cylindrical filter element from the base end towards the head end of the filter element, the inlet device may for example, in terms of the outer circumference, have a trumpet shape, the largest cross-section of which merges integrally into the element material of the closed filter disc. Since the inlet device on the base end of the element material also represents a certain resistance for the flow through the filter element, there is an improved flow in the head region of the element and thus overall a homogenised flow distribution during filtration operation.

In some embodiments of the filter element, it is provided that the hollow cylindrical element material is held between two end caps, the one end cap of which, configured as a twin mounting, simultaneously serves to fix the closed, disc-shaped element material to the end of the annular element material. In this way, the hollow cylindrical element material can be separated from the disc-shaped element material by means of the twin mounting and each can be replaced separately with a new element material. For example, however, it is provided that the disc-shaped element material is permanently bonded or welded to the hollow cylindrical element material at the end so that the disc merges into the hollow cylinder without a gap. In this way, a homogenized incident flow is also achieved in the region where the disc-shaped element material joins the hollow cylindrical element material and the filter element constructed in this way can be replaced as a whole with a single new element.

For improved flow guidance and in some embodiments, it is further provided that the two end caps each have a central recess, the diameter of which is identical, the diameter of the end cap with which the filter element can be connected to an outlet of the filter housing having a diameter which corresponds to the inner diameter of the hollow cylinder of the filter element. In particular, the latter feature enables resistance-free discharge of the filtrate towards the outlet of the filter device.

For example, the closed, disc-shaped element material is to be formed from a filter blank which comes from a sheet former, in particular from a Rapid-Köthen sheet forming system available on the market.

In an example method for operating a filter element in a filter device as discussed above, the system is used to clean contaminants, for example varnish, from a fluid flow, the filter element being accommodated in a filter housing, with an inlet for unfiltered medium and with an outlet for filtrate, wherein, when unfiltered medium flows through the filter element from outside to inside, it flows through both a hollow cylindrical element material and an element material which closes said hollow cylinder at its one free end, the filtrate flow being guided from the inside of the hollow cylinder to the outlet of the filter housing, and the respective element material being accommodated seal-free in the associated filter housing for flow around all sides, from outside to inside. Varnish is regularly not listed in the literature as a "hard" particle and thus does not represent actual particulate contamination; in fact, it is routinely sludge-like oil ageing products.

The cellulose used for the filter element can be constructed in the manner of a composite material. In this case, the cellulose can be combined with fillers, additives, filter aids, etc.

Silicates, for example kaolin, carbonates, for example chalk; sulphates, for example gypsum, barium sulphate; oxides, for example titanium dioxide; aramid fibers and/or carbon fibers, are regularly used as fillers. Suitable additives include sizing agents, binder systems, dry and wet strengtheners, pigments, dyes, dewatering and retention agents, and defoamers. Diatomaceous earth, silica gel, perlite, zeolites or activated carbon can be used as filter aids.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

FIG. 1 shows an example filter device as a whole in a highly simplified form in the manner of a longitudinal sectional view. The filter device has a filter housing 10 which has an inlet 12 for unfiltered medium and an outlet 14 for filtrate. The filter housing 10 accommodates a replaceable filter element 16 through which unfiltered medium flows from outside to inside, according to the diagram of FIG. 2, flowing through both a hollow cylindrical element material (also referred to as 'hollow cylinder') 18 and an element material (also referred to as 'closed, disc-shaped element material') 22 which closes off this hollow cylindrical element material 18 at its one free end 20. At the other free end 24 of the filter element 16 or of the hollow cylindrical element material 18, an element cap 26 (also referred to as 'second end cap') is provided with a central recess 28 which is used to discharge filtrate and is connected to the outlet 14 of the filter housing 10. A corresponding recess 29 is formed by the free end of the hollow cylindrical element material 18 (FIG. 2).

To replace the filter element 16, a head-end housing part must be separated from a foot- or pot-end housing part holding the filter element 16, which is common practice, with the result that this will not be discussed in greater detail here. The upper element cap 26 is slid on over a connection socket as part of the outlet 14 and is sealed in this region via a sealing ring 30 on the housing side as the only seal between the element 16 and the housing 10. Otherwise, the respective element material 18, 22 is accommodated seal-free in the filter housing 10 according to FIG. 1 for incident flow on all sides, from outside to inside, according to FIG. 2. In particular, there is no seal in the base-end region of the filter housing 10 opposite the closing element material 22.

Figure 2:
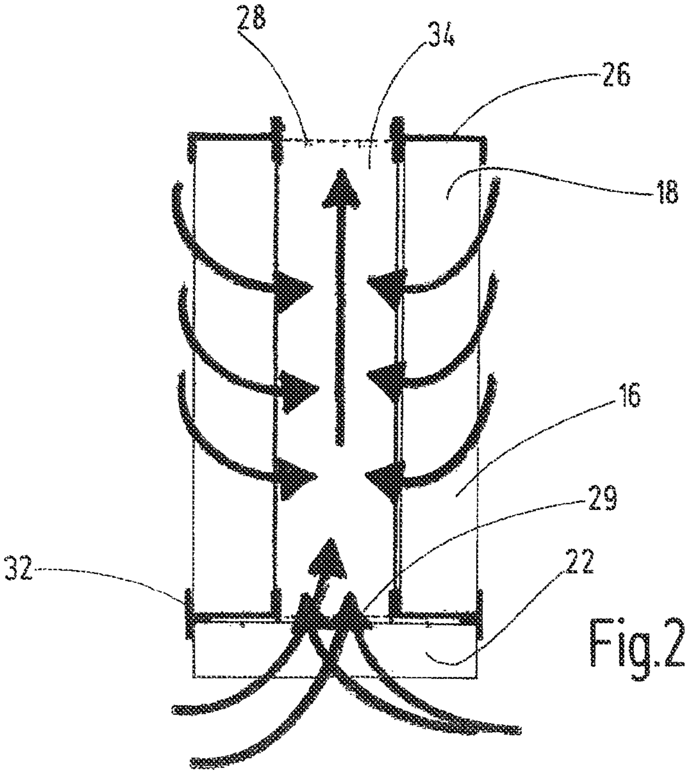
FIG. 2 shows the inserted filter element of FIG. 1 with arrows relating to the flow behavior of the filter element.

In the embodiment of a filter element 16 shown in FIGS. 1 and 2, the element material 22 is held in a foot- or base-side end cap 32 which, configured as a type of twin mounting, simultaneously serves to fix both the element material 22 and to fix the hollow cylindrical element material 18. It is known to accommodate corresponding element material of a filter element 16 in the end caps closing off said element, with the result that it will not be discussed in greater detail at this point. The element material 18, 22 of the filter element 16 is for example constructed entirely of cellulose material, i.e. both the hollow cylindrical element material 18 and the element material 22 closing it off. The term "closed" as used in the application solution means that the element material 22 is porous throughout but otherwise has no fluid passages, such as fluid-conducting restrictor passages, that could connect the environment to the hollow cylindrical interior 34 of the hollow cylinder 18. In this respect, the unfiltered medium is introduced exclusively via the porosity of the element material 22 for passage into the inner chamber 34 of the element 16.

Figure 3:
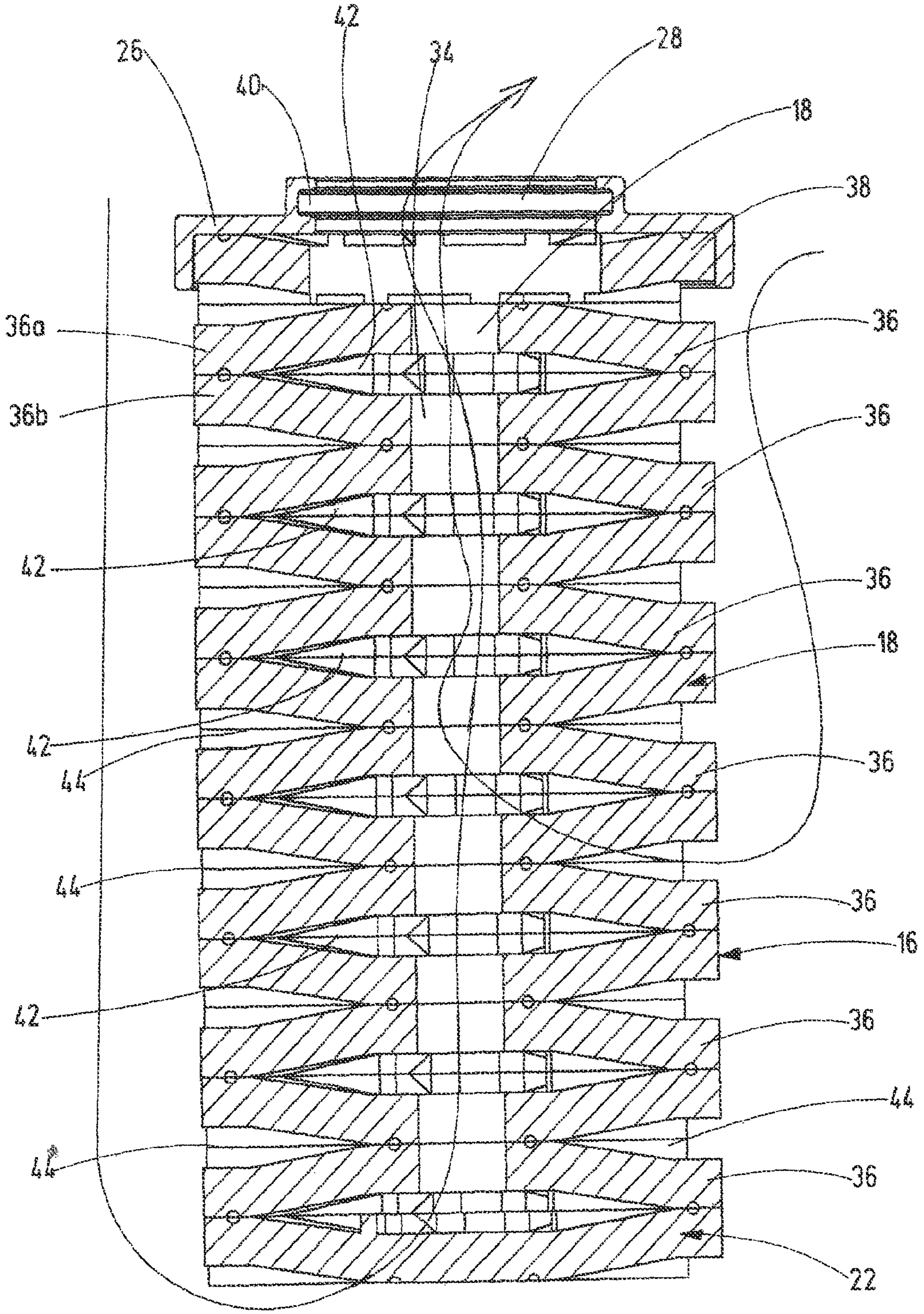
FIG. 3 shows a detail view of a longitudinal section through a second embodiment of a filter element.

As the embodiment according to FIG. 3 particularly shows, the hollow cylindrical element material 18 of the filter element 16 consists of individual, for example identical, annular filter discs 36 which, arranged one above the other or in stacked sequence, are firmly connected to one another, for example bonded to one another, on their mutually adjacent end faces. Contrary to the embodiment according to FIG. 2, as seen in the viewing direction of FIG. 3, the filter disc 36 arranged at the very bottom as the element material 22 closing off the free end of the hollow cylindrical element material 18 is not accommodated in an additional end cap 32 but rather is firmly connected, in particular firmly bonded or firmly welded, in the stacked sequence directly to the filter disc 36 located at the very bottom of the hollow cylindrical element material 18. The filter disc 38 arranged right at the very top forms a possible receptacle for the upper element cap 26 with the central recess 28, the boundary edge of which has a groove-shaped indentation 40 for receiving the sealing ring 30 as shown in FIG. 1. The element cap 26 surrounds the outer edge of the uppermost filter disc 38 on the outer circumference and is firmly connected to said filter disc, for example by means of an adhesive bond.

As FIG. 3 further shows, the individual filter discs 36 can also be formed of partial halves **36*a*, 36*b* which, viewed diametrically with respect to the longitudinal axis of the filter element 16, have between them identically formed recesses 42 opposing one another, which are formed by notch-like incisions or impressions in the filter discs 36 or are formed by two filter disc halves 36*a*, 36*b* of a filter disc 36 which adjoin each other. In addition, corresponding further recesses 44, which are configured corresponding to the recesses 42, are located between filter discs 36 in the stacked sequence. The respective recess 42, 44 thus extends from a rectangular central region into the respective filter disc 36, or into the adjacently arranged disc halves 36, 36*b*, tapering wedge-like at the edge. The said recesses 42, 44, in the manner of incisions or impressions, are only arranged on the upper side of the respective element material 18, 22 and do not engage in the hollow cylindrical inner chamber 34 of the filter element 16. The possible directions of flow through the filter element 16** are again indicated by arrows in FIG.

3, a flow taking place from the base end towards the inner chamber 34 of the filter element 16 for the filter disc 36 located at the very bottom in the stacked sequence.

Figure 4:
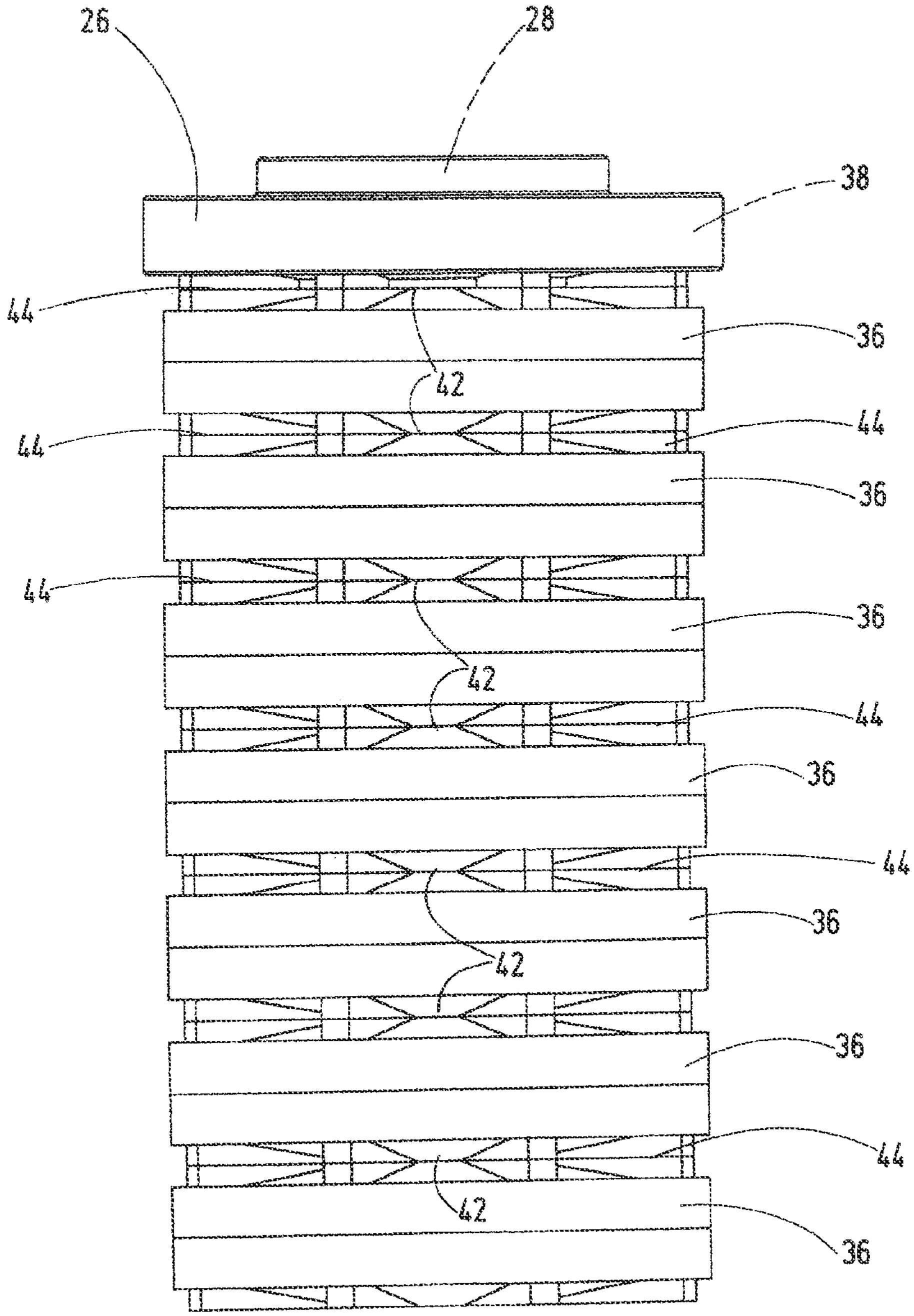
FIG. 4 shows a lateral view from the outside of an example filter element comparable to FIG. 3.

In the embodiment according to FIG. 4 which is modified in this respect, the recesses 42, 44 are formed by corresponding impressions or incisions on the circumference, in each case the recesses 42, 44 stiffening the stability of the cellulose elements as a whole and serving to improve flow guidance for the unfiltered medium flow from outside into the interior 34 of the filter element 16. In each case, there are four recesses 42, 44 located in a common radial plane in each filter disc 36 or between disc halves 36*a*, 36*b* of a filter disc 36. In particular, the disc-shaped element material 22, which is closed except for its porosity, is formed from a filter blank which comes from the sheet former.

Figure 5:
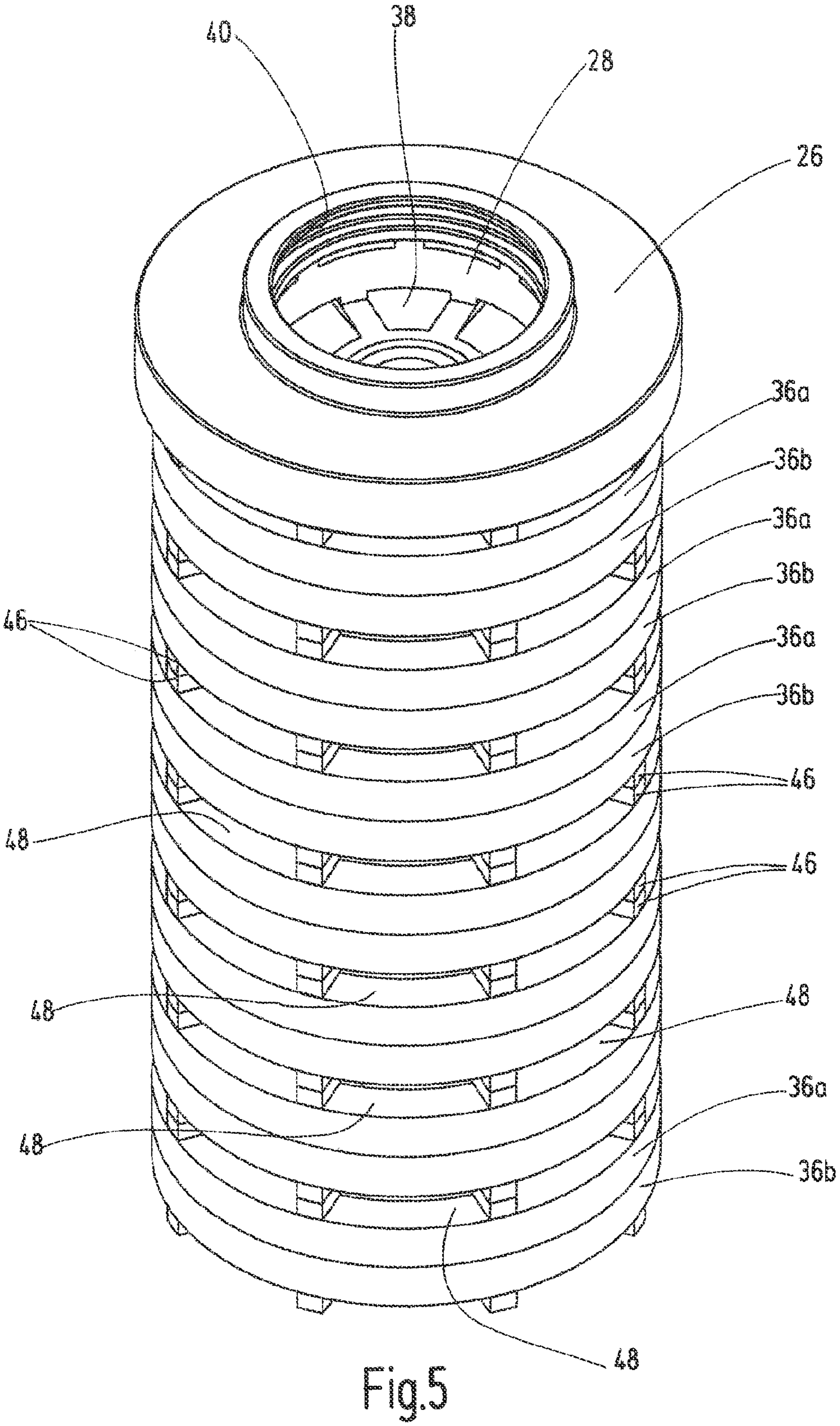
FIG. 5 shows a perspective view of a third embodiment of a filter element.

In the embodiment according to FIG. 5, the individual disc halves 36*a*, 36*b*, forming individual filter discs, have radially extending limiting rods that are directed towards one another, as spacers 46 which define recesses 48 between them, which in turn serve to improve fluid guidance but again do not completely penetrate the filtering material, comparable to the recesses 42, 44 according to the embodiments described above.

As FIG. 1 further shows in the manner of a dashed line, if necessary, the inner chamber 34 can also additionally have a flow guidance or inlet device 50 which, for improved flow guidance inside the filter element 16, has a trumpet shape, the largest cross-section of which merges integrally into the element material of the closed lower filter disc 36.

The solution according to the teachings herein is used in particular to remove so-called varnish from a fluid flow, regularly formed of oil ageing products which are not listed in the literature as "hard particles" and which accordingly do not represent particulate contamination in the proper sense. The application further relates to dewatering, in particular cellulose has the property of being able to absorb water. In this way, it is also possible to achieve oil-water separation. Finally, there is also the possibility of particulate filtration.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A filter device having a filter housing, which filter housing has an inlet for unfiltered medium and an outlet for filtrate and which accommodates a replaceable filter element; wherein when unfiltered medium flows through said filter element from outside to inside, the unfiltered medium flows through both, a hollow cylindrical element material and an element material, which element material closes off the hollow cylindrical element material at one free end; wherein at the other free end of the hollow cylindrical element material, an element cap with a central recess is provided to discharge filtrate to the outlet in the filter housing which outlet is connected to the central recess; wherein the respective element material is accommodated seal-free in the filter housing for incident flow on all sides, from outside to inside; and wherein the hollow cylindrical element material is held between a first and a second end cap, wherein the first end cap is configured to also affix the element material to the end of the hollow cylindrical element material.

2. A filter element having a hollow cylindrical element material which is provided on a first free end face with an element material, which element material closes off the hollow cylindrical element material; wherein one or more of the element material and the hollow cylindrical element material consists at least partly of cellulose material; and wherein the hollow cylindrical element material is held between a first and a second end cap, wherein the first end cap is configured to also affix the element material to the end of the hollow cylindrical element material.

3. The filter element of claim 2, wherein the hollow cylindrical element material of the filter element is formed of individual annular filter discs which, arranged one above the other, are firmly connected to one another on their mutually adjacent end faces and wherein the element material which closes off the hollow cylindrical element material at its one free end is formed of a closed filter disc.

4. The filter element of claim 3, wherein the filter discs of cellulose material have the same filter properties, and wherein the annular filter discs are constructed identically in terms of their element material.

5. The filter element of claim 3, wherein the individual annular filter discs have recesses on an outer circumference which are formed by incisions, impressions, or by adjacent spacers between the filter discs.

6. The filter element of claim 2, wherein the element material is provided with an additional geometry in the form of an inlet device which engages in the interior of the hollow cylindrical element material.

7. The filter element of claim 2, wherein the inlet device, in terms of the outer circumference, has a tapering shape, the largest cross-section of which merges integrally into the element material of the closed filter disc.

8. The filter element of claim 2, wherein the first and second end caps each have a central recess with a given diameter, and wherein the diameter of the second end cap has a diameter which substantially corresponds to the inner diameter of the hollow cylinder of the filter element.

9. The filter element of claim 2, wherein the element material is formed of a filter blank.

10. The filter element of claim 9, wherein the filter blank comes from a sheet former.

11. A method for operating the filter element of claim 2 in a filter device, which filter device is used for cleaning contaminants from a fluid flow, and which filter device is accommodated in the filter housing having an inlet for unfiltered medium and an outlet for filtrate; wherein when unfiltered medium flows through the filter element from outside to inside, the unfiltered medium flows through both, a hollow cylindrical element material and an element material, which element material closes off said hollow cylindrical element material at one free end; wherein the filtrate flow is guided from the inside of the hollow cylindrical element material to the outlet of the filter housing; wherein the respective element material is accommodated seal-free in the filter housing for flow around all sides, from outside to inside; and wherein the hollow cylindrical element material is held between a first and a second end cap, wherein the first end cap is configured to also affix the closed, disc-shaped element material to the end of the hollow cylindrical element material.

12. The filter element of claim 2, wherein the hollow cylindrical element material of the filter element is formed of identical annular filter discs which, arranged one above the other, are firmly connected to one another on their mutually adjacent end faces and wherein the element material which closes off the hollow cylindrical element material at its one free end is formed of a closed filter disc.

13. The filter element of claim 2, wherein the hollow cylindrical element material of the filter element is formed of individual annular filter discs which, arranged one above the other, are bonded to one another on their mutually adjacent end faces and wherein the element material which closes off the hollow cylinder at its one free end is formed of a closed filter disc.

14. The filter element of claim 3, wherein all filter discs of cellulose material have the same filter properties, and wherein the annular filter discs are constructed identically in terms of their element material.

15. The filter element of claim 3, wherein the individual annular filter discs have recesses on the outer circumference which are formed by incisions, impressions, or by adjacent spacers between the filter discs.

16. The filter element of claim 4, wherein the individual annular filter discs have recesses on the outer circumference which are formed by incisions, impressions, or by adjacent spacers between the filter discs.

17. The filter element of claim 3, wherein the element material is provided with an additional geometry in the form of an inlet device which engages in the interior of the hollow cylindrical element material.

18. The filter element of claim 4, wherein the element material is provided with an additional geometry in the form of an inlet device which engages in the interior of the hollow cylindrical element material.

19. The filter element of claim 5, wherein the element material is provided with an additional geometry in the form of an inlet device which engages in the interior of the hollow cylindrical element material.

* * * * *